United States Patent
Allen et al.

(10) Patent No.: US 9,819,184 B2
(45) Date of Patent: Nov. 14, 2017

(54) BALANCING POWER GRID PARAMETERS USING DISTRIBUTED ENERGY CONTROL

(71) Applicant: Elwha LLC, Bellevue, WA (US)

(72) Inventors: Paul G. Allen, Mercer Island, WA (US); Kenneth G. Caldeira, Redwood City, CA (US); Roderick A. Hyde, Redmond, WA (US); Muriel Y. Ishikawa, Livermore, CA (US); Jordin T. Kare, Seattle, WA (US); John Latham, Boulder, CO (US); Nathan P. Myhrvold, Medina, WA (US); Stephen H. Salter, Edinburgh (GB); Clarence T. Tegreene, Mercer Island, WA (US); David B. Tuckerman, Lafayette, CA (US); Thomas Allan Weaver, San Mateo, CA (US); Charles Whitmer, North Bend, WA (US); Lowell L. Wood, Jr., Bellevue, WA (US); Victoria Y. H. Wood, Livermore, CA (US)

(73) Assignee: Elwha LLC

( * ) Notice: Subject to any disclaimer, the term of this patent is extended or adjusted under 35 U.S.C. 154(b) by 1139 days.

(21) Appl. No.: 13/772,646

(22) Filed: Feb. 21, 2013

(65) Prior Publication Data
US 2014/0185338 A1 Jul. 3, 2014

Related U.S. Application Data

(60) Provisional application No. 61/747,450, filed on Dec. 31, 2012.

(51) Int. Cl.
*H02J 3/01* (2006.01)
*H02J 3/18* (2006.01)

(52) U.S. Cl.
CPC .............. *H02J 3/01* (2013.01); *H02J 3/1842* (2013.01); *Y02E 40/22* (2013.01)

(58) Field of Classification Search
CPC ....................................................... H02J 3/01
(Continued)

(56) References Cited

U.S. PATENT DOCUMENTS 3,825,815 A * 7/1974 Gyugyi .................. H04B 15/02
307/105
5,321,598 A * 6/1994 Moran ....................... H02J 3/01
323/207

(Continued)

FOREIGN PATENT DOCUMENTS

WO    WO 96/18937    6/1996

OTHER PUBLICATIONS

PCT International Search Report; International App. No. PCT/US2013/076517; dated Apr. 14, 2014; pp. 1-5.

*Primary Examiner* — Fritz M Fleming (57) ABSTRACT

Described embodiments include a system and a method. A system includes an energy storage device configured to store and release energy. The system includes a waveform sensor configured to detect a second harmonic or higher frequency component deviation in a waveform of electric power supplied to the system by an electrical power grid. The system includes a bi-directional switched-mode converter coupled between the energy storage device and the electrical power grid. The switched-mode converter is configured to receive and convert electric power from the electrical power grid into energy stored in the energy storage device and to convert energy released from the energy storage device into electric power and discharge the converted electric power into the electrical power grid. The system includes a waveform correction manager configured to control the bi-directional switched-mode converter in a manner implementing a (Continued)

waveform deviation reduction strategy responsive to the detected deviation in the waveform.

40 Claims, 7 Drawing Sheets

(58) Field of Classification Search
 USPC .......................................................... 307/105
 See application file for complete search history.

(56) References Cited

U.S. PATENT DOCUMENTS

| | | |
|---|---|---|
| 2008/0040296 A1 | 2/2008 | Bridges et al. |
| 2010/0156348 A1 | 6/2010 | Kirchner |
| 2010/0276998 A1 | 11/2010 | Luo et al. |
| 2011/0266871 A1 | 11/2011 | Thisted |

* cited by examiner

BALANCING POWER GRID PARAMETERS USING DISTRIBUTED ENERGY CONTROL

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 61/747,450, entitled BALANCING POWER GRID PARAMETERS USING DISTRIBUTED ENERGY CONTROL, naming Paul G. Allen, Kenneth G. Caldeira, Roderick A. Hyde, Muriel Y. Ishikawa, Jordin T. Kare, John Latham, Nathan P. Myhrvold, Stephen H. Salter, Clarence T. Tegreene, David B. Tuckerman, Thomas Allan Weaver, Charles Whitmer, Lowell L. Wood, Jr., and Victoria Y. H. Wood as inventors, filed 31 Dec. 2012, which was filed within the twelve months preceding the filing date of the present application or is an application of which a currently co-pending application is entitled to the benefit of the filing date.

RELATED APPLICATIONS

None.
The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes a system. The system includes an energy storage device configured to store and release energy. The system includes a waveform sensor configured to detect a second harmonic or higher frequency component deviation in a waveform of electric power supplied to the system by an electrical power grid. A second harmonic or higher frequency component deviation in a waveform does not include power factor distortions, i.e., resistive, capacitive, inductive, or reactive. The system includes a bi-directional switched-mode converter coupled between the energy storage device and the electrical power grid. The switched-mode converter is configured to receive and convert electric power from the electrical power grid into energy stored in the energy storage device and to convert energy released from the energy storage device into electric power and discharge the converted electric power into the electrical power grid. The system includes a waveform correction manager configured to control the bi-directional switched-mode converter in a manner implementing a waveform deviation reduction strategy responsive to the detected second harmonic or higher frequency component deviation in the waveform.

In an embodiment, the system includes an electrical load operable to generate a disruptive second harmonic or higher frequency component deviation in the waveform of the electric power supplied to the system by the electrical power grid. In an embodiment, the system includes an electrical load not operable to generate a disruptive second harmonic or higher frequency component deviation in the waveform of the electric power supplied to the system by the electrical power grid.

In an embodiment, the waveform correction manager includes a waveform correction controller. In an embodiment, the waveform correction manager includes a switch driver configured to receive the one or more instructions to implement the waveform deviation reduction strategy and to issue one or more detailed instructions implementing the waveform deviation reduction strategy. In an embodiment, the waveform correction manager includes a converter controller configured to operate the bi-directional switched-mode converter in accordance with the detailed instructions implementing the waveform deviation reduction strategy. In an embodiment, the waveform correction manager includes a converter controller configured to operate the bi-directional switched-mode converter in accordance with the one or more instructions to implement the waveform deviation reduction strategy. In an embodiment, the waveform correction manager includes a receiver configured to receive a remotely detected second harmonic or higher frequency deviation in the waveform. In an embodiment, the waveform correction manager includes a receiver configured to receive a remotely selected waveform deviation reduction strategy responsive to a remotely detected electrical load-generated deviation in the waveform. In an embodiment, the system includes a computer storage media maintaining a power cost database including power cost data relevant to the electrical power grid.

For example, and without limitation, an embodiment of the subject matter described herein includes a method. The method includes storing energy in a device having a stationary location, the stored energy received from or converted from electrical power supplied by an electrical power grid. The method includes detecting a second harmonic or higher frequency component deviation in a waveform of the electric power supplied by the electrical power grid. The method includes receiving and converting electric power from the electrical power grid into energy stored in the energy storage device, and converting energy released from the energy storage device into electrical power and discharging the converted electric power into the electrical power grid. Both are in accordance with a waveform deviation reduction strategy responsive to the detected second harmonic or higher frequency component deviation in the waveform. In an embodiment, the method includes coupling an electrical load to the electrical power supplied by the electrical grid.

For example, and without limitation, an embodiment of the subject matter described herein includes a system. The system includes means for storing energy at a stationary location. The stored energy is received from or converted from electrical power supplied by an electrical power grid. The system includes an electrical load coupled to the electrical power supplied by the electrical grid. The system includes means for detecting a second harmonic or higher frequency component deviation generated by the electrical load in a waveform of electric power supplied by an electrical power grid. The system includes means for receiving and converting electric power from the electrical power grid into energy stored in the energy storage device, and for converting energy released from the energy storage device into electrical power and discharging the converted electric power into the electrical power grid. Both are in accordance with a waveform deviation reduction strategy responsive to the detected second harmonic or higher frequency component deviation in the waveform.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 1:
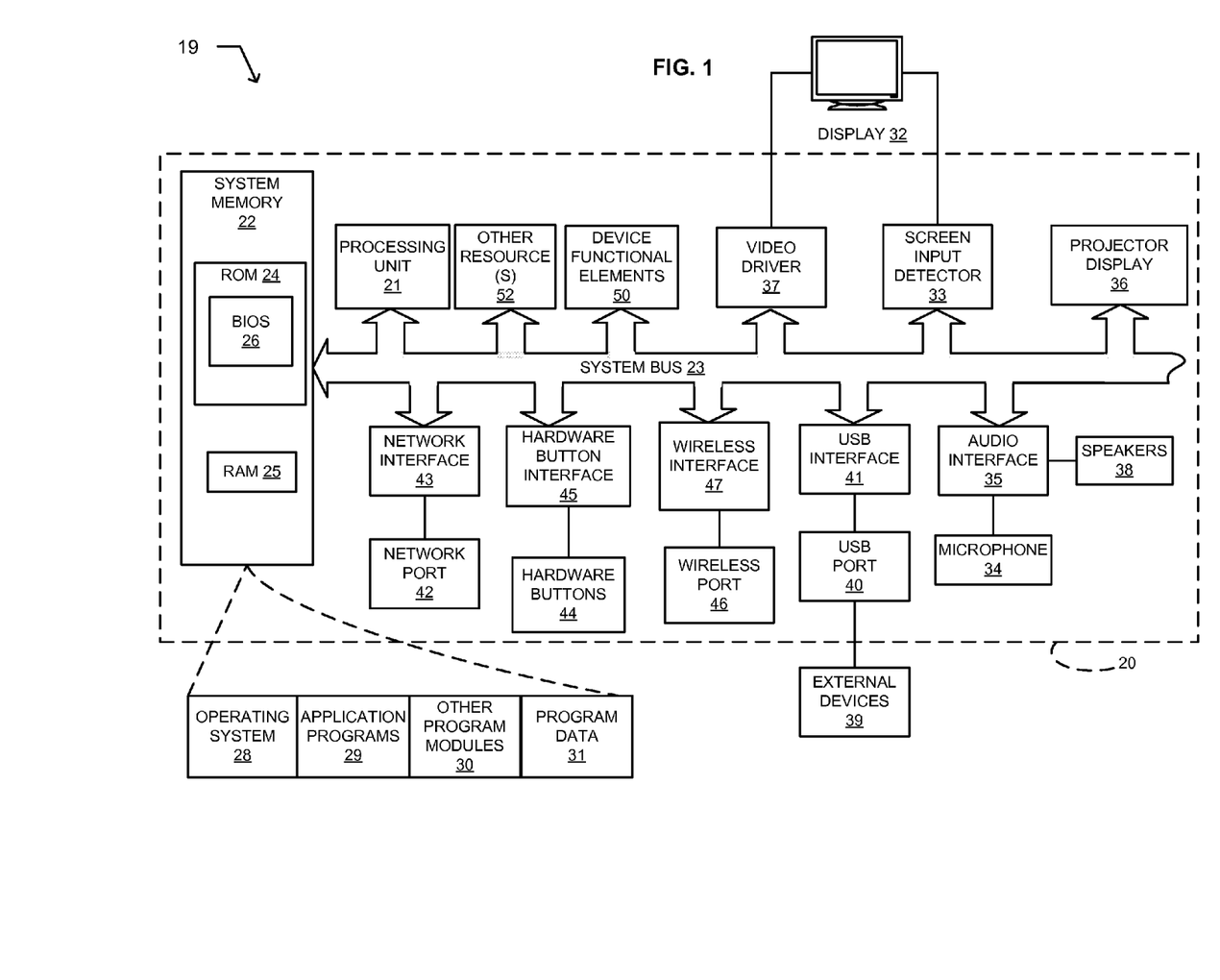
FIG. 1 illustrates an example embodiment of a thin computing device in which embodiments may be implemented.
Figure 2:
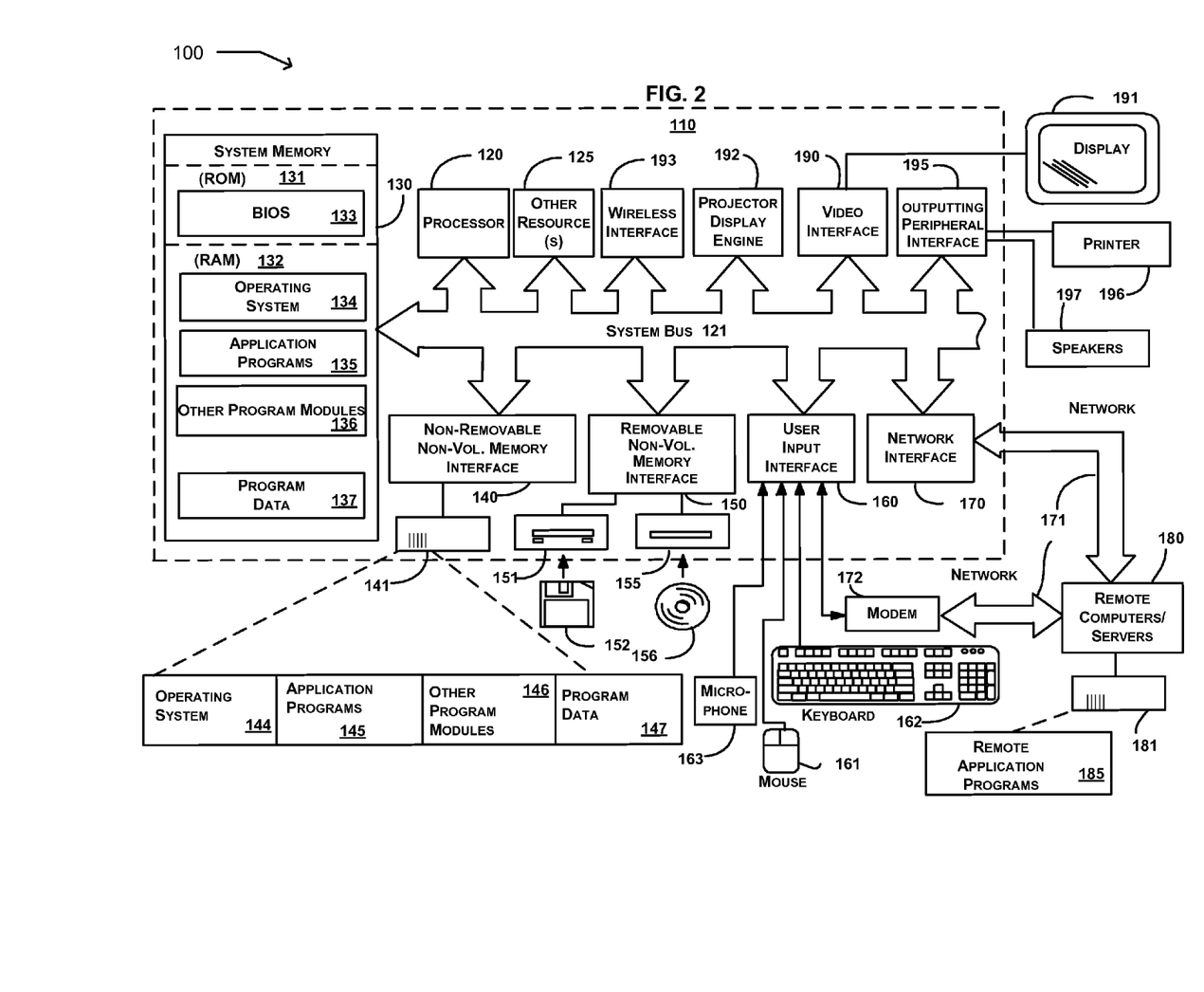
FIG. 2 illustrates an example embodiment of a general-purpose computing system in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive screen or display surface, or one or more switches or buttons with suitable input detection circuitry. A touch-sensitive screen or display surface is illustrated as a touch-sensitive display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" ® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch-sensitive screen or display surface, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing a communication link between the computers may be used.

In certain instances, one or more elements of the computing device 110 may be deemed not necessary and omitted. In other instances, one or more other elements may be deemed necessary and added to the computing device.

Figure 3:
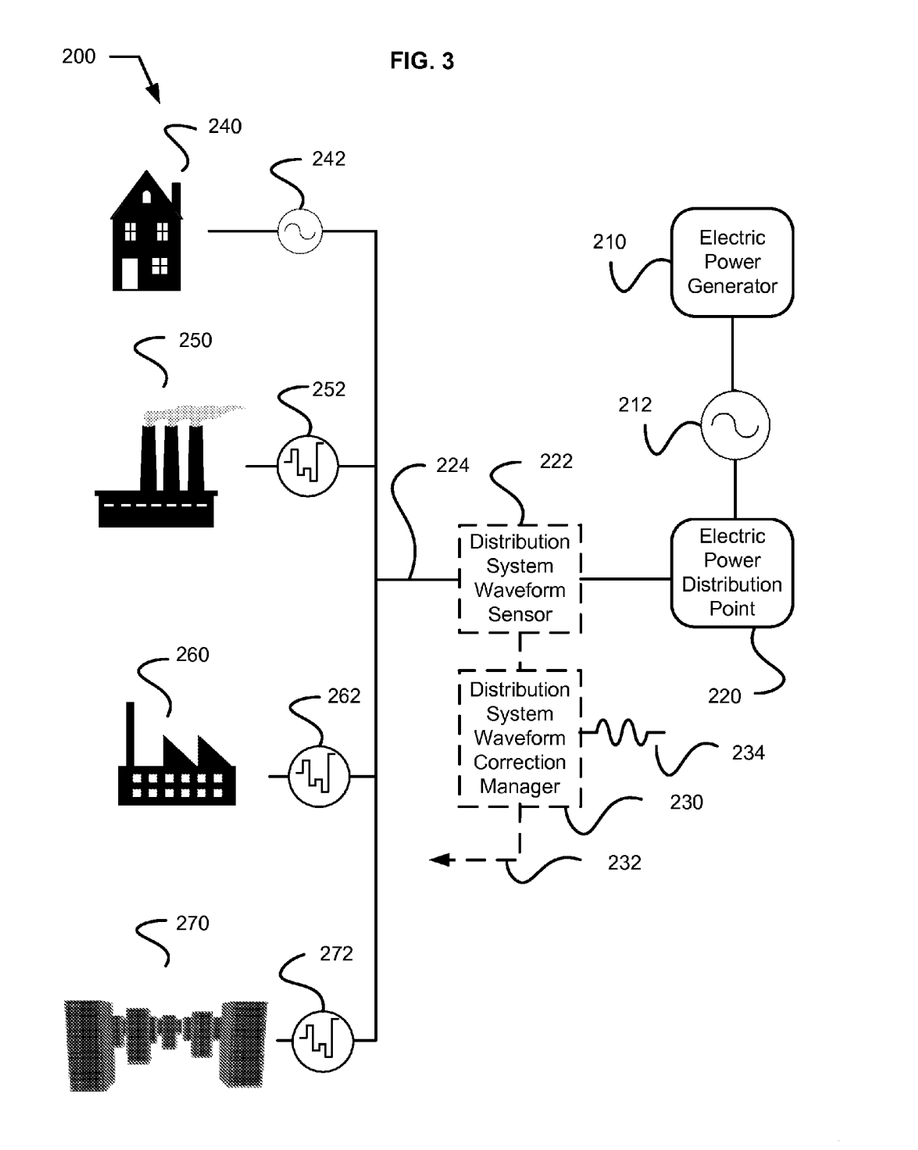
FIG. 3 illustrates an example environment 200 in which embodiments may be implemented.

FIG. 3 illustrates an example environment 200 in which embodiments may be implemented. The environment illustrates an embodiment of a portion of an electrical power grid. The environment includes an electric power generator 210 outputting alternating current electric power 212. The alternating current cycle is generally 50 or 60 Hz. For example, the electric power generator may be a group of generators at a hydroelectric facility, such as Grand Coulee Dam, or a small single generator facility. Electric power output by the electrical power generator is generally substantially free of second harmonic or higher frequency component deviations in its waveform. An electrical power grid includes numerous distribution points as the voltage is reduced and distributed to electrical power consumers. A distribution point is illustrated by electric power distribution point 220. From there, the electric power may be distributed to a variety of loads by the portion of the electrical power grid 224.

The environment 200 illustrates several loads. These loads include housing and residences, illustrated as a house 240, a factory 250, an industrial complex 260, and a server farm 270. A load may be a substantially neutral consumer that does not impart significantly disruptive second harmonic or higher frequency component deviations into the waveform of the electrical power grid. A substantially neutral consumer is illustrated by the house 240 and a substantially neutral waveform 242. Other loads may be electrically disruptive and impart a significant second harmonic or higher frequency component deviation into the waveform of the electrical power grid. Disruptive loads are illustrated by the factory 250 imparting a significant second harmonic or higher frequency component deviation 252 into the waveform, the industrial complex 260 imparting a significant second harmonic or higher frequency component deviation 262 into the waveform, and the server farm 270 imparting a significant second harmonic or higher frequency component deviation 272 into the waveform.

The environment 200 includes a distribution system waveform sensor 222 configured to detect a second harmonic or higher frequency component deviation imparted into the waveform 212 of electric power supplied to the system at electrical power grid 224. The environment also includes a distribution system waveform correction manager 230, which is configured to communicate via a physical connection 232 or a wireless connection 234.

Figure 4:
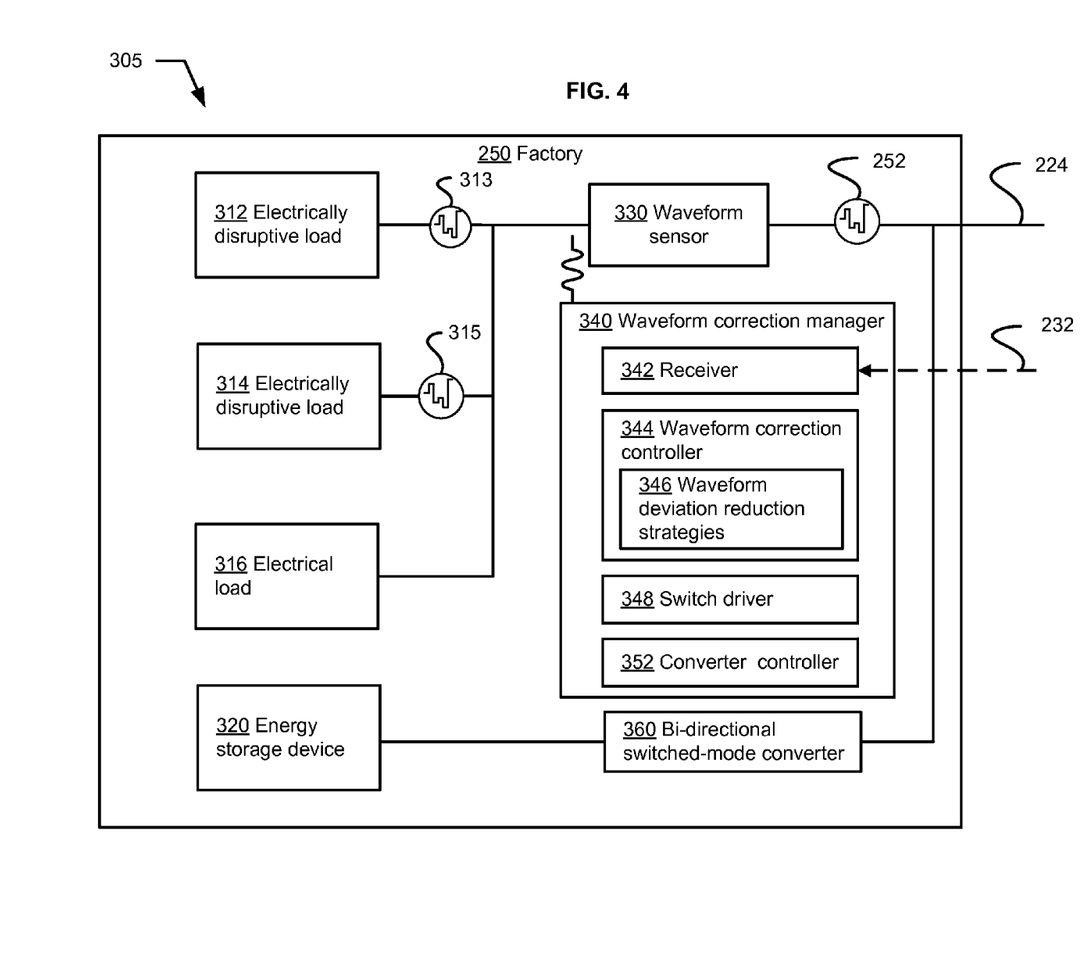
FIG. 4 illustrates a system 305 having an example load 250 that may impart a significant second harmonic or higher frequency component deviation into the waveform of the electrical power grid.

FIG. 4 illustrates an example load that may impart a significant second harmonic or higher frequency component deviation into the waveform of the electrical power grid. The example load is illustrated as the factory 250 of FIG. 3. A system 305 may be implemented in the factory. The system includes an energy storage device 320 configured to store and release energy. The system includes a waveform sensor 330 configured to detect a second harmonic or higher frequency component deviation in a waveform of electric power supplied to the system by an electrical power grid. A second harmonic or higher frequency component deviation in a waveform does not include power factor distortions, i.e., resistive, capacitive, inductive, or reactive. In an embodiment, the waveform sensor is configured to detect the waveform deviation imparted by one disruptive load, or an aggregate of two or more disruptive loads. For example, the waveform sensor may be configured to detect only waveform deviation 313, or waveform deviation 313 and waveform deviation 315 in combination. A second harmonic or higher frequency component deviation may include a harmonic content or noise. The system includes a bi-directional switched-mode converter 360 coupled between the energy storage device and the electrical power grid 224. The switched-mode converter is configured to receive and convert electric power from the electrical power grid into energy stored in the energy storage device, and to convert energy released from the energy storage device into electric power and discharge the converted electric power into the electrical power grid. The system includes a waveform correction manager 340 configured to control the bi-directional switched-mode converter in a manner implementing a waveform deviation reduction strategy responsive to the detected second harmonic or higher frequency component deviation in the waveform.

In an embodiment of the system 305, the energy storage device 320 includes a reversible electrochemical energy storage device. For example, a reversible electrochemical energy storage device may include a rechargeable battery, or a regenerative fuel cell. In an embodiment, the energy storage device includes an electromechanical energy storage device. For example, an electromechanical energy storage device may include a flywheel, a compressed-air storage device, a spring-based storage device, or a gravity-based storage device, etc. In an embodiment, the energy storage device includes a capacitive energy storage device.

In an embodiment, the elements of the system 305 are physically housed in a building or structure receiving electric power supplied by the electrical power grid. For example, the building or structure may include a residential, commercial, or manufacturing orientated building or structure. In an embodiment, the elements of the system are physically located in a factory or industrial complex receiving electric power supplied by the electrical power grid.

In an embodiment, the system 305 includes an electrical load operable to generate a second harmonic or higher frequency component deviation in the waveform of the electric power supplied to the system by the electrical power grid. The electrical load is illustrated as electrically disruptive load 312, or electrically disruptive load 314. For example, electrically disruptive load 312 may include a large motor producing harmonics or noise. In an embodiment, the system includes an electrical load not operable to generate a disruptive second harmonic or higher frequency component deviation in the waveform of the electric power supplied to the system by the electrical power grid. This electrical load is illustrated by electrical load 316.

In an embodiment of the system 305, the waveform sensor 330 includes a waveform sensor physically located in a factory or industrial complex receiving the electric power supplied by the electrical power grid. In an embodiment, the waveform sensor includes a waveform sensor physically located in a building or structure receiving the electric power supplied by the electrical power grid. In an embodiment, the waveform sensor is located physically remote from a building or structure receiving the electric power supplied by the electrical power grid. A remote waveform sensor is illustrated by the distribution system waveform sensor 222 described in conjunction with FIG. 3. In an embodiment, the waveform sensor is located at a junction point in the electrical power grid. For example, located at a substation, or at a junction point. In an embodiment, the waveform sensor is configured to detect an electrical load-generated second harmonic or higher frequency component deviation in a waveform of electric power supplied to the system by an electrical power grid. In an embodiment, the waveform sensor is configured to detect a second harmonic or higher frequency component deviation having a periodicity less than the alternating current cycle of the electrical power grid. In an embodiment, the waveform sensor is configured to detect a second harmonic or higher frequency component deviation in a waveform of the alternating current cycle having periodic transients transformable into at least two frequencies each greater than the alternating current cycle of the electrical power grid. For example, periodic transients may be transformable into at least two frequencies using a Fourier transform based methodology or a Laplace transform based methodology. In an embodiment, the waveform sensor is configured to detect a reoccurring second harmonic or higher frequency component deviation in a waveform of the alternating current cycle of electric power supplied to the system by an electrical power grid. For example, a regular equipment or electronic startup or shut down over the course of a day or a week may impose a second harmonic or higher frequency component deviation having a periodicity less than the alternating current cycle of the electrical power grid. In an embodiment, the waveform sensor is configured to detect a pattern of reoccurring second harmonic or higher frequency component deviation in a waveform of the alternating current cycle of electric power supplied to the system by an electrical power grid. In an embodiment, the waveform sensor is configured to detect and determine a variation, schedule, or pattern in a second harmonic or higher frequency component deviation in a waveform of the alternating current cycle of electric power supplied to the system by an electrical power grid. In an embodiment, the waveform sensor is further configured to decompose the second harmonic or higher frequency component deviation in the waveform of electric power into at least one frequency component greater than the frequency of the alternating current cycle of the electrical power grid. In an embodiment, the waveform sensor is further configured to decompose the second harmonic or higher frequency component deviation in the waveform of electric power into at least one frequency component greater than four times the frequency of the alternating current cycle of the electrical power grid.

In an embodiment, the bi-directional switched-mode converter 360 is configured to convert electric power received from the electrical power grid 224 into energy stored in the local energy storage device in response to a first instruction and to convert energy stored in the local energy storage device into electric power and discharge the converted electric power into the electrical power grid in response to a second instruction. In an embodiment, the bi-directional switched-mode converter has a switching period shorter than the frequency of the alternating current cycle of the electrical power grid. For example, a switching period with a frequency of more than 400 Hz is a shorter time interval than 60 Hz.

In an embodiment, the waveform correction manager 340 is configured to drive the bi-directional switched-mode converter 360 to diminish or reduce one or more components of the detected second harmonic or higher frequency component deviation in the waveform. In an embodiment, the waveform correction manager is configured to drive the bi-directional switched-mode converter to diminish or reduce one or more components of the detected second harmonic or higher frequency component deviation in the waveform induced in the power grid by another node. In an embodiment, the waveform correction manager is configured to schedule driving the bi-directional switched-mode converter to diminish or reduce a reoccurring variation, schedule, or pattern in the detected second harmonic or higher frequency component deviation in the waveform.

In an embodiment, the waveform deviation reduction strategy includes reducing the detected second harmonic or higher frequency component deviation in the waveform 252 of electric power supplied to the system by an electrical power grid. In an embodiment, the waveform deviation reduction strategy includes reducing the detected second harmonic or higher frequency component deviation in the waveform of electric power imposed on the electric power supplied to the system by an electrical power grid. For example, the strategy includes reducing waveform deviation 313, or waveform deviation 313 and waveform deviation 315 in combination. In an embodiment, the waveform deviation reduction strategy includes supplying to the electrical power grid an offsetting or counteracting current responsive to the detected second harmonic or higher frequency component deviation in the waveform. In an embodiment, the offsetting current is sourced from or sunk into the energy storage device 320 by the bi-directional switched-mode converter. In an embodiment, the waveform deviation reduction strategy includes supplying to the electrical power grid an offsetting current having at least one frequency component greater than the frequency of the alternating current cycle of the electrical power grid.

In an embodiment, the waveform correction manager 340 includes a waveform correction controller 344. In an embodiment, the waveform correction controller is configured to decompose the detected deviation in the waveform into at least one frequency component greater than the frequency of the alternating current cycle of the electrical power grid. In an embodiment, the waveform correction controller is configured to select the waveform deviation reduction strategy in response to the detected second harmonic or higher frequency deviation in the waveform from at least two stored waveform deviation reduction strategies 346. For example, the second harmonic or higher frequency deviation may be detected locally by the waveform sensor 330, or remotely, for example, by the distribution system waveform sensor 222 described in conjunction with FIG. 3. In an embodiment, the waveform correction controller configured to respond to commands from a remote waveform correction manager related to the implementing the waveform deviation reduction strategy. In an embodiment, the waveform correction controller is configured to issue one or more instructions to implement the waveform deviation reduction strategy.

In an embodiment, the waveform correction manager 340 includes a switch driver 348 configured to receive the one or more instructions to implement the waveform deviation reduction strategy and to issue one or more detailed instructions implementing the waveform deviation reduction strategy. For example, the instructions may be originated by the waveform correction manager or the waveform correction controller 344. In an embodiment, the waveform correction manager includes a converter controller 352 configured to operate the bi-directional switched-mode converter 360 in accordance with the detailed instructions implementing the waveform deviation reduction strategy. For example, the converter controller tells the bi-directional switched-mode converter when to take power out of the storage device or when to put power into the energy storage device. In an embodiment, the waveform correction manager includes a converter controller 352 configured to operate the bi-directional switched-mode converter in accordance with the one or more instructions to implement the waveform deviation reduction strategy.

In an embodiment, the waveform correction manager 340 includes a receiver 342 configured to receive a remotely detected electrical load-generated deviation in the waveform. For example, the remotely detected electrical load-generated deviation in the waveform may be detected, for example, by the distribution system waveform sensor 222 described in conjunction with FIG. 3. In an embodiment, the waveform correction manager includes a receiver configured to receive a remotely selected waveform deviation reduction strategy responsive to a remotely detected electrical load-generated deviation in the waveform. For example, the distribution system waveform correction manager 230 may select the waveform deviation reduction strategy and wirelessly transmit 234 it to the receiver 342. Alternatively, the selected waveform deviation reduction strategy may be transmitted to the receiver over the electric power grid, over a network, or over a dedicated line.

In an embodiment, the waveform correction manager 340 is configured to evaluate an effectiveness of the waveform deviation reduction strategy in reducing the detected second harmonic or higher frequency component deviation. In an embodiment, the evaluation is at least partially based on an updated detected second harmonic or higher frequency deviation detected by the waveform sensor 330 or the distribution system waveform sensor 222. In an embodiment, the waveform correction manager is configured to evaluate an effectiveness of the waveform deviation reduction strategy in reducing the detected second harmonic or higher frequency deviation at least partially based on an updated detected second harmonic or higher frequency component deviation. In an embodiment, the waveform correction manager is further configured to store the evaluation of the effectiveness of the waveform deviation reduction strategy in reducing the detected second harmonic or higher frequency component deviation.

In an embodiment, the system 305 includes a computer storage media maintaining a power cost database including power cost data relevant to the electrical power grid. For example, the computer storage media may include the computer storage media described in conjunction with FIG. 2. In an embodiment, the waveform correction manager is configured to control the bi-directional switched-mode converter in a manner implementing a waveform deviation reduction strategy responsive to the detected second harmonic or higher frequency component deviation in the waveform and according to the power cost data.

Figure 5:
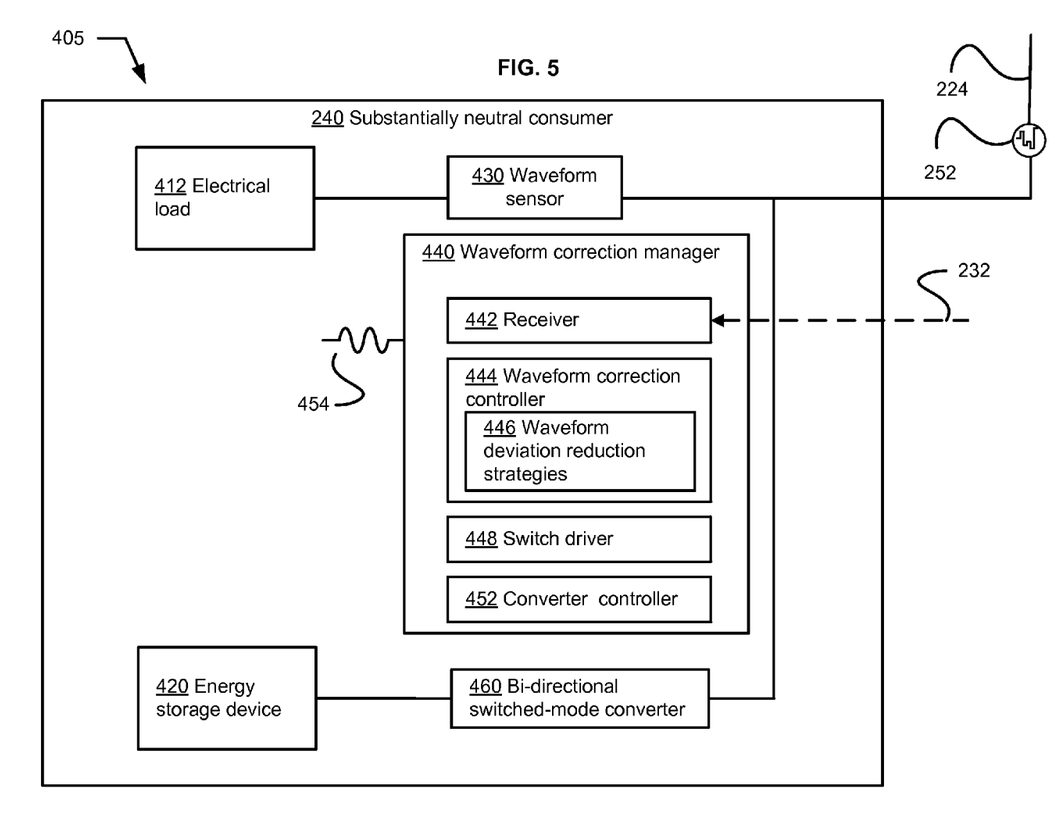
FIG. 5 illustrates a system 405 having an example load 240 expected not to impart a significant second harmonic or higher frequency component deviation into the waveform of the electrical power grid.

FIG. 5 illustrates an example load expected not to impart a significant second harmonic or higher frequency component deviation into the waveform of the electrical power grid. The example load is illustrated as the substantially neutral consumer 240, which typically may be a residence or a small retail business. A system 405 may be implemented in the substantially neutral consumer. The system includes an energy storage device 420 configured to store and release energy. The system includes a waveform sensor 430 configured to detect a second harmonic or higher frequency component deviation in a waveform 252 of electric power supplied to the system by an electrical power grid 224. A second harmonic or higher frequency component deviation in a waveform does not include power factor distortions, i.e., resistive, capacitive, inductive, or reactive. The system includes a bi-directional switched-mode converter 460 coupled between the energy storage device and the electrical power grid. The switched-mode converter is configured to receive and convert electric power from the electrical power grid into energy stored in the energy storage device, and to convert energy released from the energy storage device into electric power and discharge the converted electric power into the electrical power grid. The system includes a waveform correction manager 440 configured to control the bi-directional switched-mode converter in a manner implementing a waveform deviation reduction strategy responsive to the detected second harmonic or higher frequency component deviation in the waveform. The system also includes a receiver 442, a waveform controller 444, at least two waveform deviation reduction strategies 446, a switch driver 448, and a converter controller 452.

Figure 6:
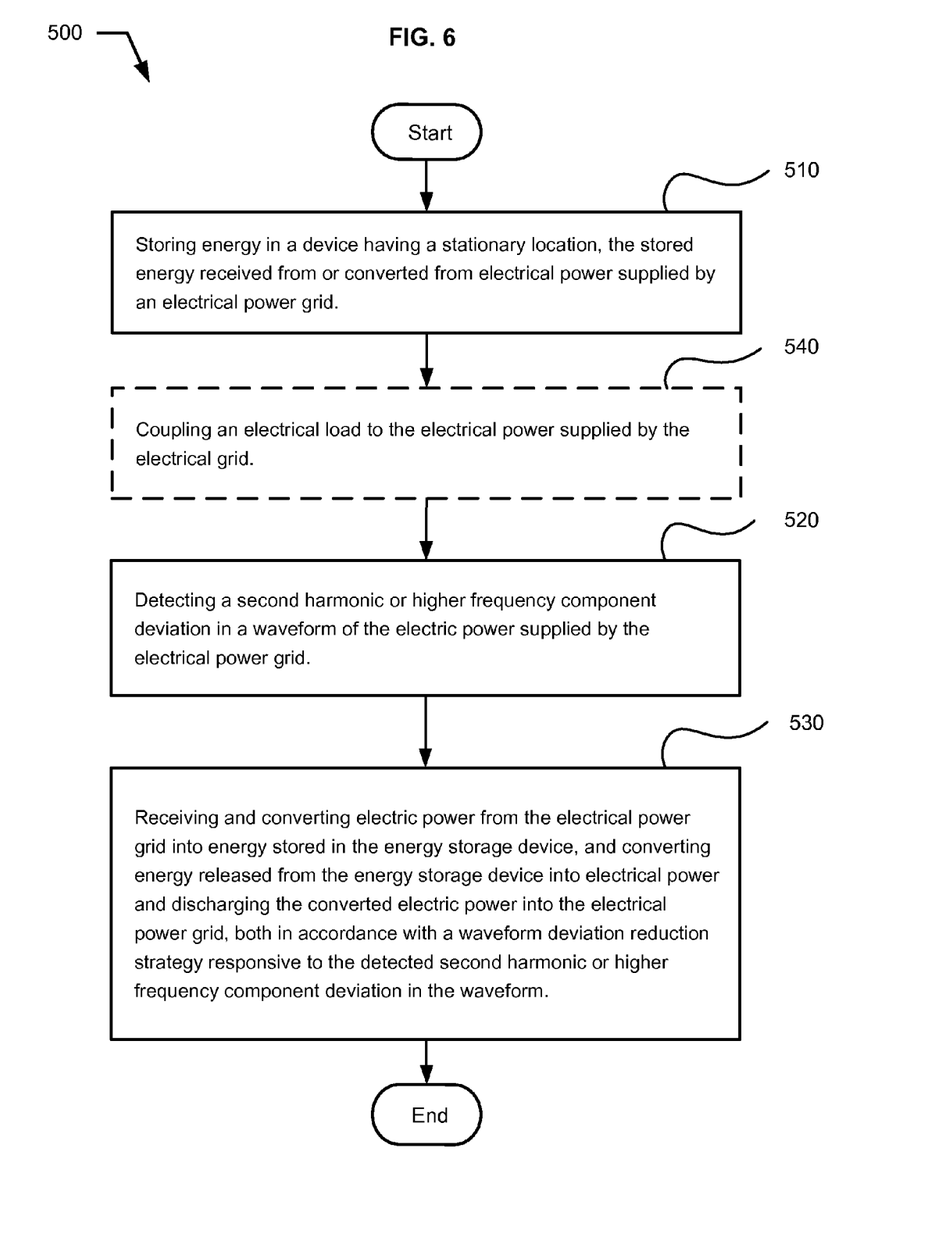
FIG. 6 illustrates an operational flow 500.

FIG. 6 illustrates an operational flow 500. After a start operation, the operational flow includes a stowage operation 510. The stowage operation includes storing energy in a device having a stationary location. The stored energy is received from or converted from electrical power supplied by an electrical power grid. In an embodiment, the stowage operation may be implemented using the energy storage device 320 described in conjunction with FIG. 4. A recognition operation 520 includes detecting a second harmonic or higher frequency component deviation in a waveform of the electric power supplied by the electrical power grid. In an embodiment, the recognition operation may be implemented using the waveform sensor 330 described in conjunction with FIG. 4, or the distribution waveform sensor 222 described in conjunction with FIG. 3. A balancing operation 530 includes receiving and converting electric power from the electrical power grid into energy stored in the energy storage device, and converting energy released from the energy storage device into electrical power and discharging the converted electric power into the electrical power grid. Both the receiving and discharging operation are performed in accordance with a waveform deviation reduction strategy responsive to the detected second harmonic or higher frequency component deviation in the waveform. In an embodiment, the balancing operation may be implemented using the waveform correction manager 340 and the bi-directional switched-mode converter 360 described in conjunction with FIG. 4. In an embodiment, the balancing operation may be implemented using the waveform correction manager 440 and the bi-directional switched-mode converter 560 described in conjunction with FIG. 5. The operational flow includes an end operation.

In an embodiment, the operational flow includes coupling 540 an electrical load to the electrical power supplied by the electrical grid. In an embodiment, the electrical load produces the second harmonic or higher frequency component deviation in the waveform of the electric power supplied by the electrical power grid. In an embodiment, the electrical load does not produce a disruptive second harmonic or higher frequency component deviation in the waveform of the electric power supplied by the electrical power grid.

In an embodiment of the recognition operation 520, the detecting includes detecting a second harmonic or higher frequency component deviation in a waveform of the electric power supplied to a building or structure, the building or structure housing the energy storage device. In an embodiment, the detecting includes detecting a second harmonic or higher frequency component deviation in a waveform of the electric power supplied to a factory or industrial complex, the factory or industrial complex including the energy storage device.

In an embodiment of the balancing operation 530, the receiving and converting electrical power includes receiving and converting electrical power with a switching frequency greater than the frequency of the alternating current cycle of the electrical power grid. In an embodiment, the receiving and converting electrical power includes receiving and converting electrical power with a switching frequency of at least twice the frequency of the alternating current cycle of the electrical power grid.

Figure 7:
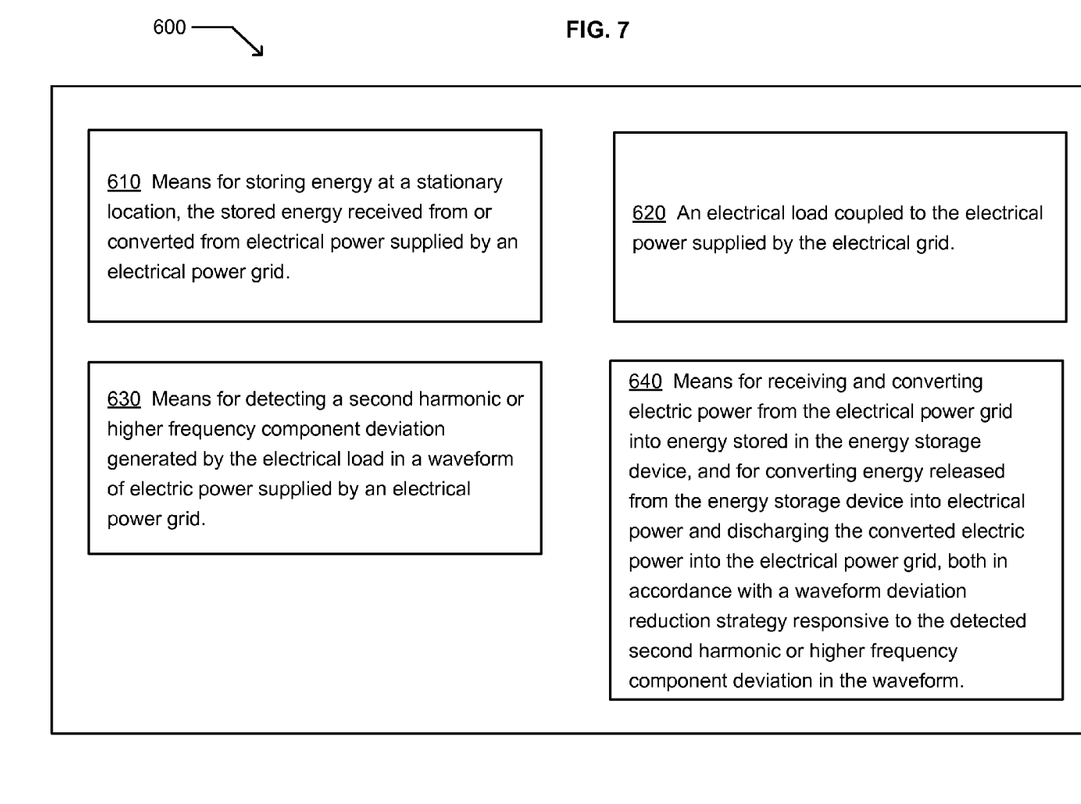
FIG. 7 illustrates a system 600.

FIG. 7 illustrates a system 600. The system includes means 610 for storing energy at a stationary location. The stored energy is received from or converted from electrical power supplied by an electrical power grid. The system includes an electrical load 620 coupled to the electrical power supplied by the electrical grid. The system includes means 630 for detecting a second harmonic or higher frequency component deviation generated by the electrical load in a waveform of electric power supplied by an electrical power grid. The system includes means 640 for receiving and converting electric power from the electrical power grid into energy stored in the energy storage device, and for converting energy released from the energy storage device into electrical power and discharging the converted electric power into the electrical power grid. Both the receiving and converting electric power, and the converting and discharging are in accordance with a waveform deviation reduction strategy responsive to the detected second harmonic or higher frequency component deviation in the waveform.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   an energy storage device configured to store and release energy;
   a waveform sensor configured to detect a second harmonic or higher frequency component deviation in a waveform of electric power supplied to the system by an electrical power grid;
   a bi-directional switched-mode converter coupled between the energy storage device and the electrical power grid, the switched-mode converter configured to receive and convert electric power from the electrical power grid into energy stored in the energy storage device and to convert energy released from the energy storage device into electric power and discharge the converted electric power into the electrical power grid;
   a waveform correction manager configured to control the bi-directional switched-mode converter in a manner implementing a waveform deviation reduction strategy responsive to the detected second harmonic or higher frequency component deviation in the waveform; and
   a computer storage media maintaining a power cost database including power cost data relevant to the electrical power grid, wherein the waveform correction manager is configured to control the bi-directional switched-mode converter in a manner implementing a waveform deviation reduction strategy responsive to the detected second harmonic or higher frequency component deviation in the waveform and according to the power cost data.

2. The system of claim 1, wherein the energy storage device includes a reversible electrochemical energy storage device.

3. The system of claim 1, wherein the energy storage device includes an electromechanical energy storage device.

4. The system of claim 1, wherein the energy storage device includes a capacitive energy storage device.

5. The system of claim 1, wherein the elements of the system are physically housed in a building or structure receiving electric power supplied by the electrical power grid.

6. The system of claim 1, wherein the elements of the system are physically located in a factory or industrial complex receiving electric power supplied by the electrical power grid.

7. The system of claim 1, further comprising:
   an electrical load operable to generate a second harmonic or higher frequency component deviation in the waveform of the electric power supplied to the system by the electrical power grid.

8. The system of claim 1, further comprising:
   an electrical load not operable to generate a disruptive second harmonic or higher frequency component deviation in the waveform of the electric power supplied to the system by the electrical power grid.

9. The system of claim 1, wherein the waveform sensor includes a waveform sensor physically located in a factory or industrial complex receiving the electric power supplied by the electrical power grid.

10. The system of claim 1, wherein the waveform sensor includes a waveform sensor physically located in a building or structure receiving the electric power supplied by the electrical power grid.

11. The system of claim 1, wherein the waveform sensor is located physically remote from a building or structure receiving the electric power supplied by the electrical power grid.

12. The system of claim 1, wherein the waveform sensor is located at a junction point in the electrical power grid.

13. The system of claim 1, wherein the waveform sensor is configured to detect an electrical load-generated second harmonic or higher frequency component deviation in a waveform of electric power supplied to the system by an electrical power grid.

14. The system of claim 1, wherein the waveform sensor is configured to detect a second harmonic or higher frequency component deviation in a waveform of the alternating current cycle having periodic transients transformable into at least two frequencies each greater than the alternating current cycle of the electrical power grid.

15. The system of claim 1, wherein the waveform sensor is configured to detect a reoccurring second harmonic or higher frequency component deviation in a waveform of the alternating current cycle of electric power supplied to the system by an electrical power grid.

16. The system of claim 1, wherein the waveform sensor is configured to detect and determine a variation, schedule, or pattern in a second harmonic or higher frequency component deviation in a waveform of the alternating current cycle of electric power supplied to the system by an electrical power grid.

17. The system of claim 1, wherein the waveform sensor is further configured to decompose the second harmonic or higher frequency component deviation in the waveform of electric power into at least one frequency component greater than the frequency of the alternating current cycle of the electrical power grid.

18. The system of claim 1, wherein the bi-directional switched-mode converter is configured to convert electric power received from the electrical power grid into energy stored in the energy storage device in response to a first instruction and to convert energy stored in the energy storage device into electric power and discharge the converted electric power into the electrical power grid in response to a second instruction.

19. The system of claim 1, wherein the bi-directional switched-mode converter includes a bi-directional switched-mode converter having a switching period shorter than the frequency of the alternating current cycle of the electrical power grid.

20. The system of claim 1, wherein the waveform correction manager is configured to drive the bi-directional switched-mode converter to diminish or reduce one or more components of the detected second harmonic or higher frequency component deviation in the waveform.

21. The system of claim 20, wherein the waveform correction manager is configured to drive the bi-directional switched-mode converter to diminish or reduce one or more components of the detected second harmonic or higher frequency component deviation in the waveform induced in the power grid by another grid node.

22. The system of claim 1, wherein the waveform correction manager is configured to schedule driving the bi-directional switched-mode converter to diminish or reduce a reoccurring variation, schedule, or pattern in the detected second harmonic or higher frequency component deviation in the waveform.

23. The system of claim 1, wherein the waveform deviation reduction strategy includes reducing the detected second harmonic or higher frequency component deviation in the waveform of electric power supplied to the system by an electrical power grid.

24. The system of claim 1, wherein the waveform deviation reduction strategy includes reducing the detected second harmonic or higher frequency component deviation in the waveform of electric power imposed on the electric power supplied to the system by an electrical power grid.

25. The system of claim 1, wherein the waveform deviation reduction strategy includes supplying to the electrical power grid an offsetting or counteracting current responsive to the detected second harmonic or higher frequency component deviation in the waveform.

26. The system of claim 25, wherein the offsetting current is sourced from or sunk into the energy storage device by the bi-directional switched-mode converter.

27. The system of claim 25, wherein the waveform deviation reduction strategy includes supplying to the electrical power grid an offsetting current having at least one frequency component greater than the frequency of the alternating current cycle of the electrical power grid.

28. The system of claim 1, wherein the waveform correction manager includes a waveform correction controller.

29. The system of claim 28, wherein the waveform correction controller is configured to decompose the detected deviation in the waveform into at least one frequency component greater than the frequency of the alternating current cycle of the electrical power grid.

30. The system of claim 28, wherein the waveform correction controller is configured to select the waveform deviation reduction strategy in response to the detected second harmonic or higher frequency deviation in the waveform from at least two stored waveform deviation reduction strategies.

31. The system of claim 28, wherein the waveform correction controller configured to respond to commands from a remote waveform correction manager related to the implementing the waveform deviation reduction strategy.

32. The system of claim 28, wherein the waveform correction controller is configured to issue one or more instructions to implement the waveform deviation reduction strategy.

33. The system of claim 32, wherein the waveform correction manager includes a switch driver configured to receive the one or more instructions to implement the waveform deviation reduction strategy and to issue one or more detailed instructions implementing the waveform deviation reduction strategy.

34. The system of claim 33, wherein the waveform correction manager includes a converter controller configured to operate the bi-directional switched-mode converter in accordance with the detailed instructions implementing the waveform deviation reduction strategy.

35. The system of claim 32, wherein the waveform correction manager includes a converter controller configured to operate the bi-directional switched-mode converter in accordance with the one or more instructions to implement the waveform deviation reduction strategy.

36. The system of claim 1, wherein the waveform correction manager includes a receiver configured to receive a remotely detected second harmonic or higher frequency deviation in the waveform.

37. The system of claim 1, wherein the waveform correction manager includes a receiver configured to receive a remotely selected waveform deviation reduction strategy responsive to a remotely detected electrical load-generated deviation in the waveform.

38. The system of claim 1, wherein the waveform correction manager is configured to evaluate an effectiveness of the waveform deviation reduction strategy in reducing the detected second harmonic or higher frequency component deviation.

39. The system of claim 38, wherein the waveform correction manager is configured to evaluate an effectiveness of the waveform deviation reduction strategy in reducing the detected second harmonic or higher frequency deviation at least partially based on an updated detected second harmonic or higher frequency component deviation.

40. The system of claim 38, wherein the waveform correction manager is further configured to store the evaluation of the effectiveness of the waveform deviation reduction strategy in reducing the detected second harmonic or higher frequency component deviation.

* * * * *